United States Patent
Peddinti et al.

(10) Patent No.: US 11,216,851 B2
(45) Date of Patent: *Jan. 4, 2022

(54) INTERACTIVE RENDERING APPLICATION FOR LOW-BANDWIDTH COMMUNICATION ENVIRONMENTS

(71) Applicant: GOOGLE LLC, Mountain View, CA (US)

(72) Inventors: Raghava Viswa Mani Kiran Peddinti, Redwood City, CA (US); Lakshmi Kumar Dabbiru, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 717 days.

This patent is subject to a terminal disclaimer.

(21) Appl. No.: 15/702,366

(22) Filed: Sep. 12, 2017

(65) Prior Publication Data

US 2018/0005280 A1  Jan. 4, 2018

Related U.S. Application Data

(63) Continuation of application No. 14/744,396, filed on Jun. 19, 2015, now Pat. No. 9,773,261.

(51) Int. Cl.
*G06Q 30/00* (2012.01)
*G06Q 30/02* (2012.01)
*H04L 12/26* (2006.01)

(52) U.S. Cl.
CPC ..... *G06Q 30/0277* (2013.01); *G06Q 30/0261* (2013.01); *H04L 43/0888* (2013.01)

(58) Field of Classification Search
CPC .......... G06Q 30/0277; G06Q 30/0261; G06Q 30/02; H04L 43/0888; H04L 29/06; H04N 21/81
See application file for complete search history.

(56) References Cited

U.S. PATENT DOCUMENTS 6,317,761 B1 *  11/2001  Landsman ......... G06Q 30/0262
                                                     715/205
7,103,904 B1    9/2006   Blackketter et al.
(Continued)

FOREIGN PATENT DOCUMENTS

WO    WO-2004/068877           8/2004
WO    WO-2004068877 A1 *  8/2004 ............ H04W 28/26
(Continued)

OTHER PUBLICATIONS

Rahul Gupta and Shantipriya Parida, Challenges and Opportunities: Mobile Broadband. Retrieved online Jun. 1, 2017. https://www.researchgate.net/publication/272911292_Challenges_and_Opportunities_Mobile_Broadband (Year: 2013).*

(Continued)

*Primary Examiner* — James A Reagan
(74) *Attorney, Agent, or Firm* — Marshall, Gerstein & Borun LLP

(57) ABSTRACT

Systems and methods for providing interactive content for display in low-bandwidth communication environments are provided. A system can receive request for a web page including primary content. The system can determine that the end user computing device is communicating with the data processing system via a network connection corresponding to a bandwidth below a predetermined threshold. The system can, responsive to determining that the network connection corresponds to a bandwidth below the predetermined threshold, provide the web page including the primary video content and web page code invoking a low bandwidth advertisement rendering script responsive to the request for the web page. The low bandwidth advertisement rendering script can be configured to cause the client device to receive an ad rendering application and an ad content (Continued)

package, and then render an interactive ad corresponding to the ad content package.

18 Claims, 10 Drawing Sheets

(56) References Cited

U.S. PATENT DOCUMENTS

| | | | | |
|---|---|---|---|---|
| 8,291,095 B2* | 10/2012 | Cobb | ............ | G06Q 30/02 709/229 |
| 8,561,104 B1* | 10/2013 | Dow | ............ | H04N 21/44209 725/34 |
| 9,313,553 B2* | 4/2016 | Sridhar | ............ | H04L 67/325 |
| 9,773,261 B2* | 9/2017 | Peddinti | ............ | G06Q 30/0277 |
| 10,091,076 B2* | 10/2018 | Kieviet | ............ | H04L 67/20 |
| 2006/0274869 A1* | 12/2006 | Morse | ............ | H04L 67/303 375/352 |
| 2008/0115185 A1* | 5/2008 | Qiu | ............ | H04N 21/2343 725/118 |
| 2008/0282290 A1 | 11/2008 | Malik et al. | | |
| 2009/0070217 A1 | 3/2009 | Dharmaji et al. | | |
| 2009/0099911 A1 | 4/2009 | Ota | | |
| 2010/0257572 A1* | 10/2010 | Sridhar | ............ | H04L 65/4076 725/116 |
| 2011/0004892 A1 | 1/2011 | Dharmaji | | |
| 2013/0219440 A1* | 8/2013 | Sridhar | ............ | H04N 21/2402 725/95 |
| 2013/0263179 A1 | 10/2013 | Dow et al. | | |
| 2014/0279075 A1 | 9/2014 | Massoudi | | |
| 2014/0368557 A1 | 12/2014 | Bastani | | |
| 2015/0082239 A1* | 3/2015 | Zhao | ............ | A63F 13/00 715/788 |
| 2015/0281298 A1* | 10/2015 | Swaminathan | ............ | H04L 67/02 709/231 |
| 2015/0350855 A1* | 12/2015 | Huang | ............ | H04L 51/04 455/426.1 |
| 2016/0316320 A1* | 10/2016 | Chin | ............ | H04L 67/06 |

FOREIGN PATENT DOCUMENTS

| | | | | |
|---|---|---|---|---|
| WO | WO 2004068877 A1 * | 8/2004 | ......... | H04L 12/5692 |
| WO | WO-2011032282 A1 * | 3/2011 | ........... | G06T 11/001 |
| WO | WO-2016022606 A1 * | 2/2016 | ............. | H04L 67/02 |

OTHER PUBLICATIONS

Rahul Gupta and Shantipriya Parida. Challenges and Opportunities: Mobile Broadband. Retrieved online Jun. 1, 2017. https://www.researchgate.net/profile/Shantipriya-Parida/publication/272911292_Challenges_and_Opportunities_Mobile_Broadband/links/568bedc108ae129fb5cb93da/Challenges-and-Opportunities-Mo (Year: 2013).*

Ruoyu Wang et al. Steal This Movie—Automatically Bypassing DRM Protection in Streaming Media Services. (Aug. 2013). Retrieved online Apr. 24, 2021. https://www.usenix.org/system/files/conference/usenixsecurity13/sec13-paper_wang_3.pdf (Year: 2013).*

Jeonghun Noh. Low-Latency and Robust Peer-To-Peer Video Streaming a Dissertation. (Sep. 2010). Retrieved online Apr. 24, 2021. https://stacks.stanford.edu/file/druid:sp047bn0313/Thesis_JeonghunNoh-augmented.pdf (Year: 2010).*

The Extended European Search Report for application 16812135.8 dated May 18, 2018.

International Search Report & Written Opinion on PCT/US2016/035261 dated Sep. 7, 2016.

U.S. Notice of Allowance on U.S. Appl. No. 14/744,396 dated Jun. 6, 2017.

U.S. Office Action on U.S. Appl. No. 14/744,396 dated Aug. 25, 2016.

U.S. Office Action on U.S. Appl. No. 14/744,396 dated Feb. 28, 2017.

Examination Report for EP Appln. Ser. No. 16812135.8 dated Nov. 4, 2020 (9 pages).

* cited by examiner

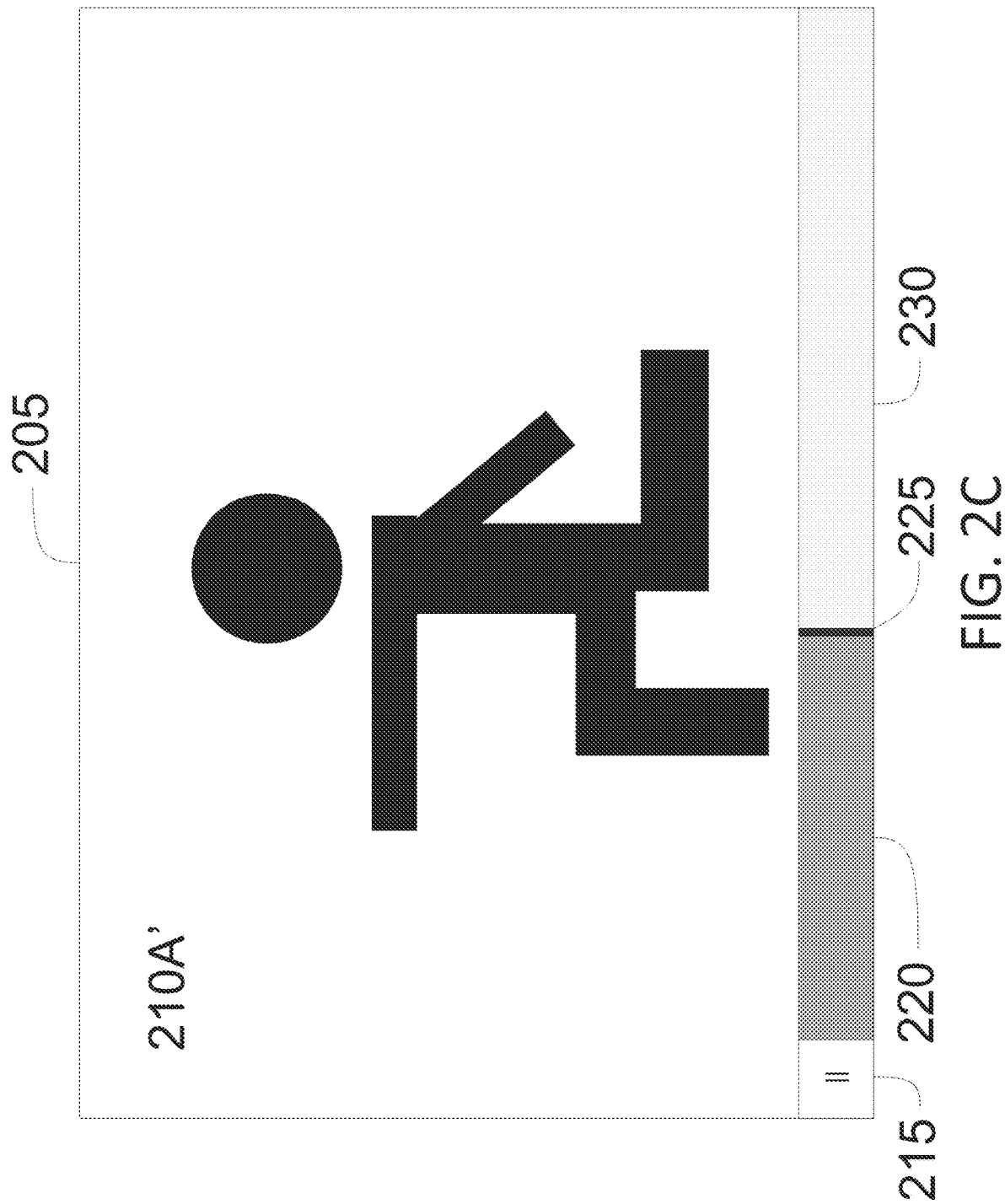

INTERACTIVE RENDERING APPLICATION FOR LOW-BANDWIDTH COMMUNICATION ENVIRONMENTS

CROSS-REFERENCE TO RELATED APPLICATIONS

This application claims the benefit and priority under 35 U.S.C. § 120 as a continuation of U.S. patent application Ser. No. 14/744,396 filed on Jun. 19, 2015, which is herein incorporated by reference in its entirety.

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

At least one aspect is directed to a method of providing interactive content for display. A data processing system including one or more processors can receive, from a client device, a request for a web page including primary video content. The data processing system can determine that the client device is communicating with the data processing system via a network connection corresponding to a bandwidth below a predetermined threshold. The data processing system can, responsive to determining that the network connection corresponds to a bandwidth below the predetermined threshold, provide, to the client device, the web page including the primary video content and web page code invoking a low bandwidth advertisement rendering script responsive to the request for the web page. The low bandwidth advertisement rendering script can be configured to cause the client device to: (i) determine, on loading the web page at the client device, by the client device, that an ad rendering application (ARA) is present, the ARA configured to render interactive ads based on content retrieved from advertisement content packages provided by the data processing system; (ii) responsive to determining that the ARA is present, detect a first time at which the primary video content streamed by a video player executing on the client device has completed buffering; (iii) responsive to detecting the first time, receive the ad content package (ACP) from the data processing system, the ACP including data to generate an interactive advertisement to be displayed by the video player; (iv) responsive to receiving the ACP packet, identify a triggering event at which to provide an interactive ad for display; and (v) responsive to identifying the triggering event at which to provide content for display, provide, for display, at the client device, the interactive advertisement corresponding to the ACP. In some implementations, determining that the client device is communicating with the data processing system via a network connection corresponding to a corresponding to a bandwidth below a predetermined threshold can include determining a location identifier using data packets received from the client device and determining that the location identifier corresponds to a location identified as being in a low bandwidth geographical area.

In some implementations, determining that the client device is communicating with the data processing system via a network connection corresponding to a corresponding to a bandwidth below a predetermined threshold can include determining, from one or more network packets received from the client device, that a bandwidth of the network connection is below a predetermined threshold.

In some implementations, identifying the triggering event at which to provide an interactive ad for display can include determining that the primary video content has completed streamed. In some implementations, identifying the triggering event at which to provide the interactive ad for display can include receiving, from the client device, a request to view a second primary video content. In some implementations, identifying the triggering event at which to provide an interactive ad for display can include responsive to identifying the triggering event at which to provide content for display, provide, for display, at the client device, the interactive advertisement corresponding to the ACP includes rendering the ACP for display based on the interactive ad.

At least one aspect is directed to a method of providing interactive content for display by a client device. The client device can include one or more processors and can be configured to receive, responsive to a request for an information resource including primary video content. The information resource can include code to invoke a function to serve interactive ads. The client device can receive, by a browser, via a network connection between the client device and a data processing system, the primary video content and present, for display, the received portions of the primary video content. The client device can determine, responsive to invoking the function to serve interactive content, that an advertisement rendering application (ARA) is stored on the client device. The ARA can be configured to receive advertisement content packages and generate interactive ads based on the advertisement content packages. The client device can detect or otherwise determine a first time at which the client device has completely received the primary video content. The client device can transmit, responsive to determining the first time, a request to receive an advertisement content package (ACP). The client device can parse, responsive to receiving the ACP, the ACP by the client device via the ARA. The client device can, responsive to identifying a triggering event at which to provide an interactive ad for display, render an interactive ad based on the ACP within a portion of the display in which the primary video content is displayed.

In some implementations, the information resource can be received responsive to a data processing system determining that the client device corresponds to a bandwidth connection below a predetermined threshold.

In some implementations, the client device can, responsive to determining that the ARA is not stored on the client device, receive the ARA from the data processing system.

In some implementations, the client device can receive an action to request a second video content. The client device can present the interactive ad for display in a portion of the display. The client device can, responsive to determining that a size of the portion of the second video content is greater than a predetermined threshold, present, for display, the second video content in the portion of the display in which the interactive ad was presented.

In some implementations, the client device can determine that the ACP has previously been received. The client device can parse the previously received ACP to generate a respective interactive ad. The client device can display the respective interactive ad responsive to determining that the primary video content has completed streaming.

In some implementations, the client device can receive an action to request a second video content. The client device can render the interactive ad. The client device can, responsive to determining that the entire second video content is received, present, for display, the second video content instead of the interactive ad.

In some implementations, identifying the triggering event at which to provide an interactive ad for display can include determining that the primary video content has completed streamed.

In some implementations, identifying the triggering event at which to provide an interactive ad for display can include receiving request to view a second primary video content.

At least one aspect is directed to a system of providing interactive content for display. The data processing system can receive, from a client device, a request for a web page including primary video content At least one aspect is directed to a method of providing interactive content for display. The data processing system can determine that the client device is communicating with the data processing system via a network connection corresponding to a bandwidth below a predetermined threshold. The data processing system can, responsive to determining that the network connection corresponds to a bandwidth below the predetermined threshold, providing, to the client device, provide, to the client device, the web page including the primary video content and web page code invoking a low bandwidth advertisement rendering script responsive to the request for the web page. The low bandwidth advertisement rendering script can be configured to cause the client device to: (i) determine, on loading the web page at the client device, by the client device, that an ad rendering application (ARA) is present, the ARA configured to render interactive ads based on content retrieved from advertisement content packages provided by the data processing system, the ARA previously received by a browser of the client device; (ii) responsive to determining that the ARA is present, detect a first time at which the primary video content streamed by a video player executing on the client device has completed buffering; (iii) responsive to detecting the first time, receive the ad content package (ACP) from the data processing system, the ACP including data to generate an interactive advertisement to be displayed by the video player; (iv) responsive to receiving the ACP packet, identify a triggering event at which to provide an interactive ad for display; and (v) responsive to identifying the triggering event at which to provide content for display, provide, for display, at the client device, the interactive advertisement corresponding to the ACP.

In some implementations, identifying the triggering event can include the client device receiving a request to view a second primary video content. In some implementations, identifying the triggering event includes determining that the primary video content has completed streaming. In some implementations, identifying the triggering event can include the client determining that a size of the received portion of the primary video content is greater than a predetermined threshold.

In some implementations, the low bandwidth advertisement rendering script can be further configured to cause the client device to determine that the ARA is not present on the client device and, responsive to the determination that the ARA is not present, receive the ARA from the data processing system.

In some implementations, the low bandwidth advertisement rendering script can be further configured to cause the client device to determine that the ARA is not an up to date version of the ARA and, responsive to determining that the ARA is not the up to date version of the ARA, receive the up to date version of the ARA.

In some implementations, responsive to identifying the triggering event at which to provide content for display, providing, for display, at the client device, the interactive advertisement corresponding to the ACP can include parsing the ACP and render for display the interactive ad based on the parsed ACP.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2C is a display depicting a video player playing primary video content, according to an illustrative implementation;

DETAILED DESCRIPTION

Figure 1:
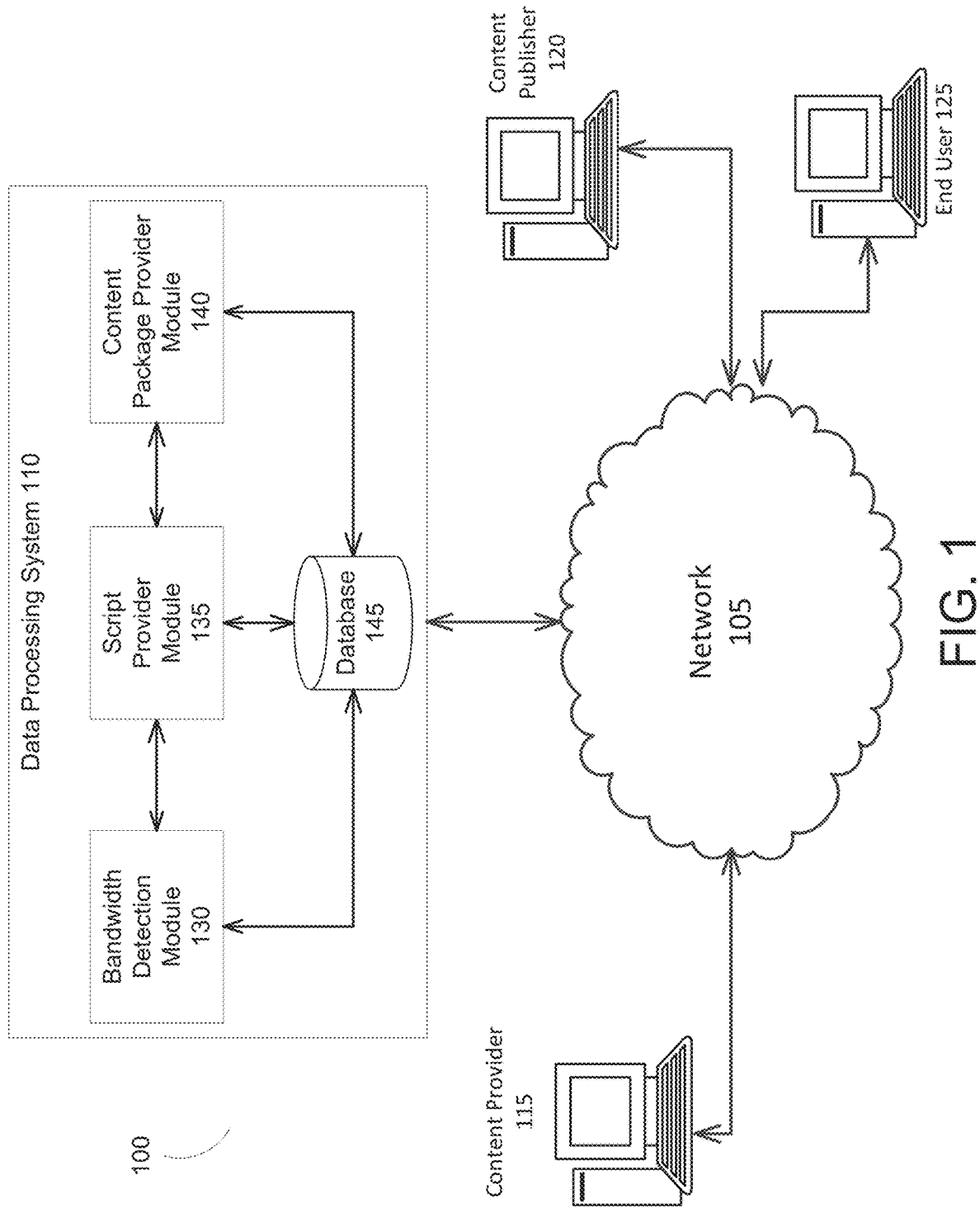
FIG. 1 is a block diagram depicting one implementation of an environment for providing interactive ads on an information resource to communication devices in a computer network environment, according to an illustrative implementation.

Following below are more detailed descriptions of various concepts related to, and implementations of, methods, apparatuses, and systems of providing interactive ads on an information resource to communication devices in a computer network environment. The various concepts introduced above and discussed in greater detail below may be implemented in any of numerous ways, as the described concepts are not limited to any particular manner of implementation.

Video advertising is a very powerful advertising platform that not only creates strong branding among users but also provides a cinematic or pseudo-interactive experience for users. However, video advertising is bandwidth intensive and when used in emerging countries where the internet speeds are low, may result in an unpleasant user experience.

The technology provided herein relies on a two-step process for displaying interactive ads. The first step involves downloading an advertisement rendering application that is configured to display interactive ads. The second step involves downloading an advertisement content package that can be parsed by the advertisement rendering application and used to generate an interactive ad, which is then displayed via the advertisement rendering application. The advertisement content package is a low bandwidth content package that includes content that can be used by the advertisement rendering application to generate and display an interactive ad. Each of the two steps may be performed during a bandwidth available time frame (BATF). The BATF is the time period when primary content is to be presented on a webpage is not being downloaded. As an example, consider a website that displays videos. When a user requests to access a video via the website via a browser, the browser begins to download the video content from a content server of the website as well as other content items to display on the webpage. The browser begins to stream the video while the video is still buffering. If the length of the video is greater than the amount of time the browser takes to buffer the entire video, the browser typically remains idle (i.e., not downloading content) until the browser receives the user's next request for content. The period of time the browser remains idle after the browser completely buffers the video and before the browser receives a subsequent request for content from the user can be referred to as the BATF.

The technology provided herein describes downloading the advertisement rendering application and advertisement content packages during one or more BATFs. In some implementations, the browser can first download the advertisement rendering application during a first BATF. Once the advertisement rendering application is downloaded, the browser can download an application content package in a subsequent BATF, for instance, during the BATF corresponding to a second video request. The application content package can include content that the advertisement rendering application can parse and use to display an interactive ad. The size of each application content package may be much smaller than the size of an interactive advertisement since the advertisement content package does not include the advertisement rendering application. In addition, in some implementations, the application content package can include links to content, which the ARA can access to download or otherwise retrieve content.

At least one aspect is directed to a method of providing interactive content for display. The method can include receiving, from a client device, a request for a web page including primary video content. The method can include determining that the client device is communicating with the data processing system via a network connection corresponding to a bandwidth below a predetermined threshold. The method can include, responsive to determining that the network connection corresponds to a bandwidth below the predetermined threshold, providing, to the client device, the web page including the primary video content and web page code invoking a low bandwidth advertisement rendering script responsive to the request for the web page.

At least one aspect is directed to a method of providing interactive content for display. The method can include receiving, responsive to a request for an information resource including primary video content, the information resource including code to invoke a function to serve interactive ads. The method can include receiving, via a network connection between the client device and a data processing system, the primary video content and presenting, for display, the received portions of the primary video content. The method can include determining, responsive to invoking the function to serve interactive ads, that an advertisement rendering application (ARA) is stored on the client device. The ARA can be configured to receive advertisement content packages and generate interactive ads based on the advertisement content packages. The method can include determining, a first time at which the client device has completely received the primary video content. The method can include transmitting, responsive to determining the first time, a request to receive an advertisement content package (ACP). The method can include responsive to receiving the ACP, the ACP via the ARA. The method can include, responsive to identifying a triggering event at which to provide content for display, rendering an interactive ad generated using data included in the ACP within a portion of the display in which the primary video content is displayed.

FIG. 1 is a block diagram depicting one implementation of an environment for providing interactive ads on an information resource to communication devices in a computer network environment. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one bandwidth detection module 130, at least one script provider module 135, at least one content package provider module 140 and at least one database 145. The bandwidth detection module 130, the script provider module 135 and the content package provider module 140 can each include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the end user computing device 125) via the network 105.

The bandwidth detection module 130, the script provider module 135 and the content package provider module 140 can include or execute at least one computer program or at least one script. The bandwidth detection module 130, the script provider module 135 and the content package provider module 140 can be separate components, a single component, or part of the data processing system 110. The bandwidth detection module 130, the script provider module 135 and the content package provider module 140 can include combinations of software and hardware, such as one or more processors configured to execute one or more scripts to: a) receive, from an end user computing device, a request for a web page including primary content; b) determine that the end user computing device is communicating with the data processing system via a network connection corresponding to a bandwidth below a predetermined threshold; and c) responsive to determining that the network connection corresponds to a bandwidth below the predetermined threshold, provide, to the end user computing device, the web page including the primary video content and web page code invoking a low bandwidth advertisement rendering script responsive to the request for the web page.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can store web pages, content items (e.g., advertisements), primary video content, at least one advertisement rendering application (ARA), at least one advertisement content package (ACP), among others served to an end user computing device 125. In some implementations, the web page, content items, primary video content, and interactive ads based on the ACP parsed via the ARA can include those illustratively depicted in FIGS. 2A-2E. Additional details of the contents of the database 145 will be provided below.

In some implementations, the bandwidth detection module 130 can be configured to receive, from an end user computing device 125, a request for a web page including primary video content. In some implementations, the bandwidth detection module 130 can be configured to determine that the request for the web page is specifically a request for a web page that includes primary video content. In some implementations, the bandwidth detection module 130 can be configured to determine that the URL address is of a webpage that includes primary video content. For example, the bandwidth detection module 130 can be configured to determine that the request for the web page with the URL address of "www.example.com/video345.html" is a request for a web page including primary video content by accessing a database of known web pages that include primary video content from the database 145. The bandwidth detection module 130 can also be configured to parse the code of the web page to determine whether the web page includes primary video content. In some implementations, the bandwidth detection module 130 can also be configured to identify one or more predetermined words or set of characters, for instance, "video" or "vdo," in the URL to determine whether the web page includes primary video content.

In some implementations, the bandwidth detection module 130 can be configured to determine that the end user computing device 125 is communicating with the data processing system 110 via a network connection corresponding to a bandwidth below a predetermined threshold. The predetermined threshold can include various measures, for example, a maximum data throughput, a maximum application level goodput, an average bit rate, or latency, among others. The predetermined threshold can include measurements of, for example, bits per second, largest packet size that can be sent over the network connection, bit error ratio, or round-trip delay time, among others.

In some implementations, the bandwidth detection module 130 can be configured to a location identifier using data packets received from the end user computing device 125 and determine that the location identifier corresponds to a location identified as being in a low bandwidth geographical area. In some implementations, the bandwidth detection module 130 can be configured to determine that the request for the web page including the primary video content includes a location identifier associated with a geographical location where the network connection may correspond to a bandwidth below a predetermined threshold. For example, the bandwidth detection module 130 can be configured to determine the geographical location based on the IP address received with the request for the web page including the primary content. In this example, based on the determined geographical location, the bandwidth detection module 130 can be configured to determine that the end user computing device 125 is communicating via a network connection corresponding to a bandwidth below a predetermined threshold.

In some implementations, the database 145 can be configured to maintain a listing of geographical locations with network connections corresponding to a bandwidth below the predetermined threshold. In some implementations, when the bandwidth detection module 130 determines that an end user computing device 125 from one geographical location is communicating with the data processing system 110 via a network connection corresponding to a bandwidth below a predetermined threshold, the bandwidth detection module 130 can be configured to determine that another end user computing device 125 from the same geographical location is communicating with the data processing system 110 via a network connection corresponding to a bandwidth below the predetermined threshold based on the same geographical location. For example, if the database 145 already includes a rural part of a state as a geographical location with a network connection corresponding to a bandwidth below the predetermined threshold and the bandwidth detection module 130 receives a request for a web page including primary video content from the end user computing device 125 that includes a location identifier associated with the rural part of a state, the bandwidth detection module 130 can be configured to determine that the end user computing device 125 is communicating with the data processing system 110 via a network connection corresponding to a bandwidth below the predetermined threshold.

In some implementations, the bandwidth detection module 130 can be configured to identify a device type of the end user computing device 125 associated with the request for the web page including the primary video content to determine that the end user computing device 125 is communicating with the data processing system 110 via a network connection corresponding to a bandwidth below a predetermined threshold based on a device type of the end user computing device 125. For example, if the device type included with the request for the web page including the primary video content indicates that the request for the web page including the primary video content is from a mobile smartphone, the bandwidth detection module 130 can be configured to determine that the end user computing device 125 is communicating via a network connection corresponding to a bandwidth below a predetermined threshold.

In some implementations, the bandwidth module 130 can be configured to determine, from one or more network packets received from the end user computing device 125, that a bandwidth of the network connection is below a predetermined threshold. In some implementations, the bandwidth detection module 130 can be configured to measure the bandwidth of the network connections between the end user computing device 125 and the data processing system 110 to determine whether the end user computing device 125 is communicating with the data processing system 110 via a network connection corresponding to a bandwidth below a predetermined threshold. In some implementations, the bandwidth detection module 130 can be configured to measure, detect or otherwise determine the maximum data throughput of the network connections between the end user computing device 125 and the data processing system 110. For example, suppose the maximum data throughput of the network connection between the end user computing device 125 and the data processing system based on the one or more packets received is measured to be 56 kilobits per second. In this example, if the predetermined threshold throughput is 8 megabits per second, which is above the measured 56 kilobits per second, the bandwidth detection module 130 can determine that the end user computing device 125 is communicating with the data processing system 110 via a network connection corresponding to bandwidth below a predetermined threshold. In some implementations, the bandwidth detection module 130 can be configured to determine the type of network connection to determine that the end user computing device 125 is communicating with the data processing system 110 via a network connection corresponding to a bandwidth below a predetermined threshold. For example, if the type of network connection between the end user computing device 125 and the data processing system 110 is 2G, the bandwidth detection module 130 can be configured to identify the network connection as 2G and based on the identification. In this example, the bandwidth detection module 130 can be configured to determine that the network connection corresponds to a bandwidth below a predetermined threshold based on identifying the network connection as 2G.

The script provider module 135 can be configured to provide, to the end user computing device 125, the web page including the primary video content and web page code invoking a low bandwidth advertisement rendering script responsive to the request for the web page. The script provider module 135 can provide the webpage in response to the bandwidth detection module 130 determining that the bandwidth of the network connection between the end user computing device 125 is below a predetermined threshold. In some implementations, the bandwidth detection module 130 can be configured to invoke the script provider module 135 to provide, to the end user computing device 125, the web page including the primary video content and web page code invoking the low bandwidth advertisement rendering script.

The low bandwidth advertisement rendering script can be configured to cause the end user computing device 125 to: (i) determine, on loading the web page at the end user computing device 125, that an ad rendering application (ARA) that can be configured to render interactive ads based on content retrieved form advertisement content packages provided by the content package provider module 140 is present; (ii) responsive to determining that the ARA is present, detect a first time at which the primary video content is streamed by a video player executing on the end user computing device 125 has completed buffering; (iii) responsive to detecting the first time, receive the ad content package (ACP) that includes data to generate an interactive advertisement to be displayed by the video player from the content package provider module 140; (iv) responsive to receiving the ACP packet, identify a triggering event; and (v) responsive to identifying the triggering event at which to provide the content for display, provide, for display, the interactive advertisement corresponding to the ACP.

In some implementations, the low-bandwidth advertisement rendering script can be configured to cause the end user computing device 125 to determine, on loading the web page at the end user computing device 125, that an ad rendering application is present (ARA). The ARA can cause the end user computing device 125 to render interactive ads based on the content received from advertisement content packages provided by the data processing system 110. In some implementations, responsive to determining that the ARA is not present at the end user computing device 125, the low-bandwidth advertisement rendering script can cause the end user computing device 125 to receive, via a network connection with the data processing system 110, the ARA from the script provider module 135. In some implementations, the end user computing device 125 can store the ARA in a location of the client device that can be accessed by the web browser through which the web page is requested. The end user computing device may, via the low-bandwidth advertisement rendering script, check to see if the ARA is stored in the location of the client device identified by one or more settings of the browser. In some implementations, responsive to determining that the ARA is not present at the end user computing device 125, the low-bandwidth advertisement rendering script can cause the end user computing device 125 to transmit a request to the data processing system 110 to request the ARA.

In some implementations, responsive to determining that the ARA is present at the end user computing device 125, the low-bandwidth advertisement rendering script can cause the end user computing device 125 determine whether the ARA present at the end user computing device 125 is an up to date version of the ARA. In some implementations, responsive to determining that the ARA present at the end user computing device 125 is not an up to date version of the ARA, the low-bandwidth advertisement rendering script can cause the end user computing device 125 to receive the up to date version of the ARA.

In some implementations, the low-bandwidth advertisement rendering script can cause the end user computing device 125 to detect a first time at which the primary video content streamed by a video player executing on the end user computing device 125 has completed buffering. In some implementations, the low-bandwidth advertisement rendering script can cause the end user computing device 125 to determine that a size of the received portion of the primary video content matches a total size of the primary video content. In some implementations, the low-bandwidth advertisement rendering script can cause the end user computing device 125 to determine that a size of the buffered portion of the primary video content matches the remaining total portion of the primary video content.

In some implementations, responsive to detecting the first time, the low-bandwidth advertisement rendering script can cause the end user computing device 125 to receive the ad content package (ACP). The ACP can include data to generate an interactive advertisement to be displayed by the video player 205. The ACP can include text, pictures, URL addresses, or any other data suitable for rendering an interactive ad by the ARA. For example, the ACP can include small size pictures of an advertiser's products, product description text, URL addresses as links to the advertiser's content, among others. In some implementations, the ACP can include URLs or links to content items used to generate the interactive ad. For example, if the URL address is to a JPEG of the advertiser's logo, the low-bandwidth advertisement rendering script can cause the end user computing device 125 to receive the JPEG file from the URL address and store the JPEG file locally on the hard drive of the end user computing device 125. In some implementations, the low-bandwidth advertisement rendering script can cause the end user computing device 125 to check to see if the content identified by a particular URL has previously been received and stored on the end user computing device. In some such implementations, the end user computing device 125 may use the content item locally stored instead of retrieving the content from the URL link, which may consume additional bandwidth.

In some implementations, responsive to receiving the ACP packet, the low-bandwidth advertisement rendering script can cause the end user computing device 125 to identify a triggering event. In some implementations, identifying the triggering event can include determining that the primary video content 210B has completed streaming. In some implementations, identifying the triggering event can include receiving a request to view another primary video content from the end user computing device 125. In some implementations, identifying the triggering event can include determining that a size of the portion of the primary video content 210B received by the end user computing device 125 is greater than a predetermined threshold. The predetermined threshold can be based on, for example, a percentage or ratio of the size of the portion of the primary video content 210A received versus the total size of the primary video content 210A, a percentage or ratio of the size of the portion of the primary video content 210A received versus the total size of the primary video content 210A, specified size of the primary video content 210A (in time or byte size), among others. For example, when more than 60% of the total size of the primary video content is received by the end user computing device 125, the end user computing device 125 can identify the receipt of the more than 60% of the size of the primary video content as a triggering event.

In some implementations, responsive to identifying the triggering event at which to provide content, the low-bandwidth advertisement rendering script can cause the end user computing device 125 to provide the interactive advertisement corresponding to the ACP for display. In some implementations, the low-bandwidth advertisement rendering script can cause the end user computing device 125 to parse, via the ARA, the ACP to generate the interactive ad. An interactive ad can include one or more content items as well as functionality that, when rendered, can allow a user to retrieve additional information or take additional actions, via the advertisement. For instance, the interactive ad can include one or more actionable items that, when clicked, can provide the user with more information. In some implementations, the interactive ad can include content extensions, such as click to call, or click for directions.

Figure 2A:
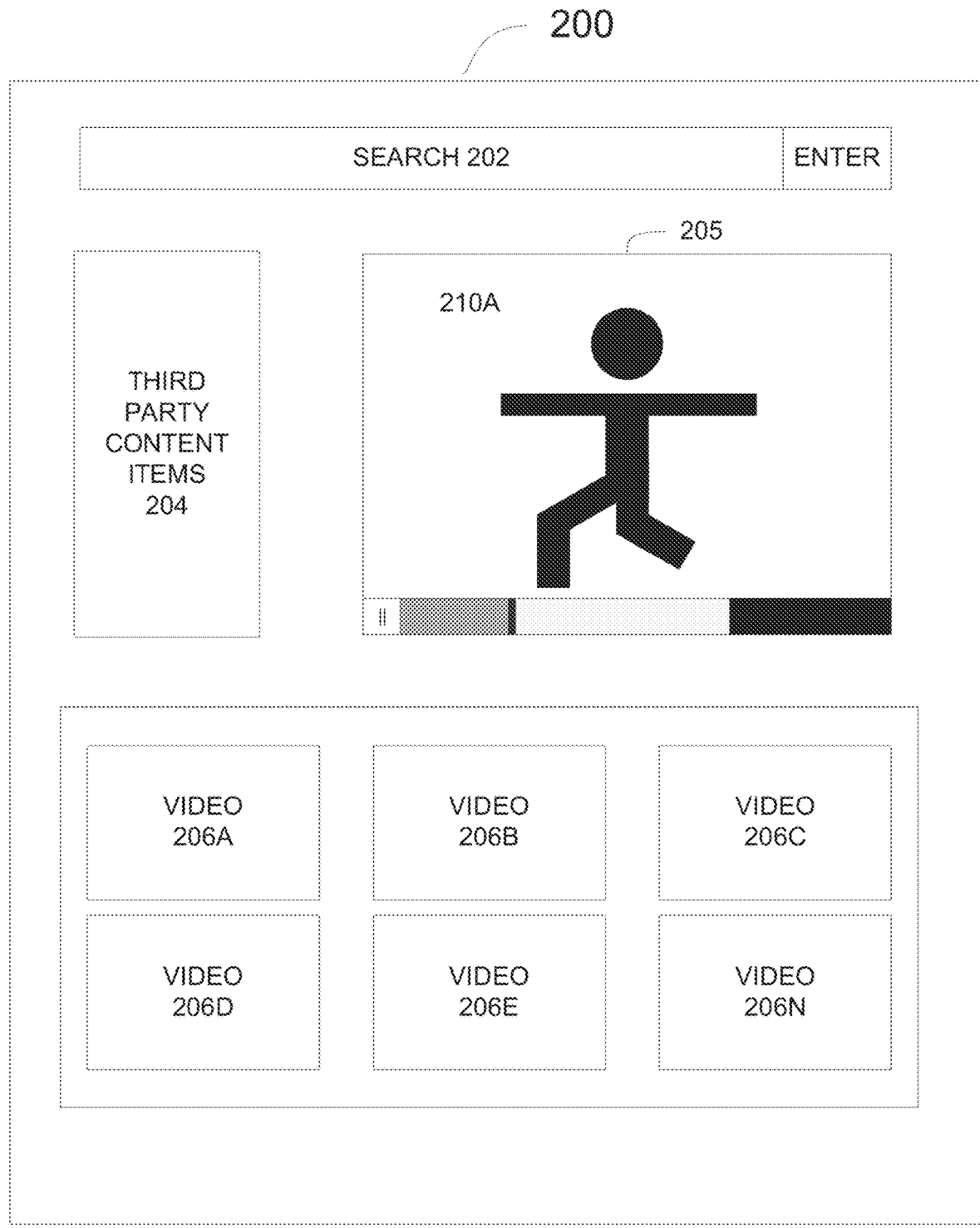
FIG. 2A is a display depicting a web page including an information resource with primary video content, according to an illustrative implementation.

Details of the functionality of the low bandwidth advertisement rendering script are described with respect to FIGS. 2A-2E. FIG. 2A is a display depicting a web page including an information resource with primary video content, according to an illustrative implementation. The web page 200 is displayed on a user interface at an end user computing device 125, such as a communication device of the user. The communication device can include any electronic computing device, including but not limited to laptops, smartphones, tablets, desktops, phablets, among others. The web page 200 can include a search query box 202, third-party content items 204, video player 205 with primary video content 210A, and thumbnails of other video content 206A-N. The search query box 202 can be provided to request content for display on the web page 200 with video primary content. The third-party items 204 can include third party content, such as a text, image, or animated advertisement displayed alongside the video player 205 with the primary video content 210A. The other video content links 206A-N can include thumbnails with links to another web page with the video player playing the video content associated with the thumbnail of the respective video content link 206A-N. The data processing system 110 can be configured to provide or stream the primary video content 205 to the end user computing device 125. At this point, the low bandwidth advertisement rendering script can be configured to be idle.

Figure 2B:
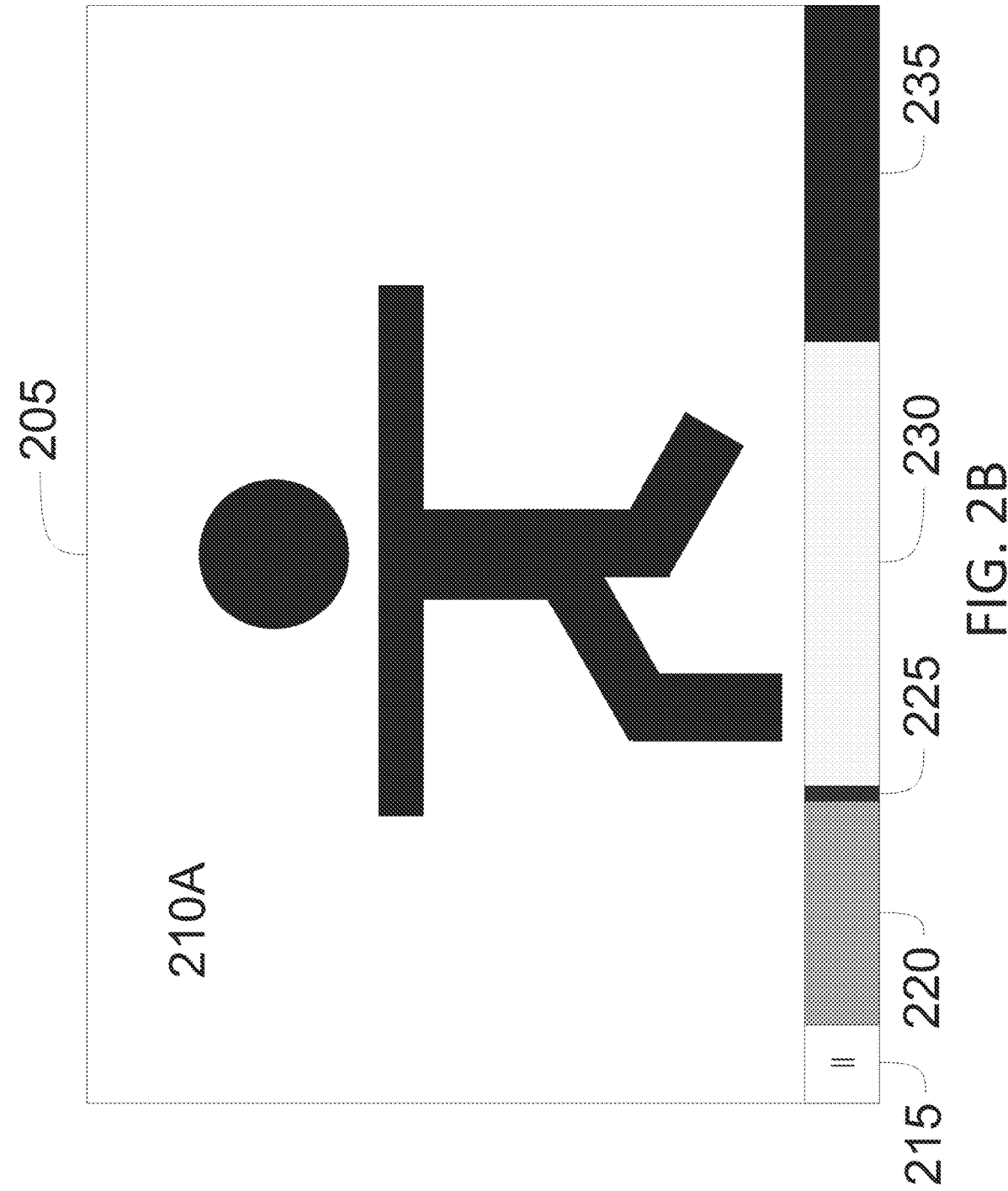
FIG. 2B is a display depicting a video player playing primary video content, according to an illustrative implementation.

FIG. 2B is a display depicting a video player playing primary video content, according to an illustrative implementation. Video player 205 can include primary video content 210A with a video seek bar generally along the bottom. The primary video content 210A of FIG. 2B depicts a stick figure walking for the purposes of explanation, as the primary video content 210A can include any animated, video, or audiovisual content. The video seek bar can include a play/pause button 215, played bar 220 (dark gray), current time point 225 (black), buffered bar 230 (light gray), and incomplete bar 235 (black). The played bar 220 can indicate the portion of the primary video content 210A already played. The current time point 225 can indicate the current point along the primary video content 210A that is being played. The buffer bar 230 can indicate the portion of the primary video content 210A buffered at the browser of the end user computing device 125. The incomplete bar 235 can indicate the portion of the primary video content 210A not yet buffered by the browser at the end user computing device 125. In further detail, FIG. 2B depicts a video player 205 that may be currently playing the primary video content 210A at the point indicated by the current time point 225, and has some amount less than the entirety of the primary video content 210A buffered as indicated by the buffer bar 230 and incomplete bar 235. During this time, in some implementations, the low-bandwidth advertisement rendering script can cause the end user computing device 125 to determine, on loading the web page, at the end user computing device 125, that an ad rendering application is present (ARA).

FIG. 2C is a display depicting a video player playing primary video content, according to an illustrative implementation. In further detail, FIG. 2C depicts a video player 205 that may be currently playing the primary video content 210A at the point indicated by the current time point 225 and has completed buffering the entirety of the primary video content 210 as indicated by the lack of an incomplete bar 230 and a full buffer bar 230. Compared to FIG. 2B, the video player 205 has played more of the primary video content 210A as indicated by the current time point 225 being further to the right than was previously depicted. In addition, the end user computing device 125 has completed buffering the primary video content 210A. At this point, in some implementations, responsive to determining that the ARA is not present, the low-bandwidth advertisement rendering script can cause the end user computing device 125 to receive the ARA from the script provider module 130.

In some implementations, the low-bandwidth advertisement rendering script can cause the end user computing device 125 to determine, on loading the web page, at the end user computing device 125, that an ad rendering application is present (ARA). In some implementations, responsive to determining that the ARA is not present at the end user computing device 125, the low-bandwidth advertisement rendering script can cause the end user computing device 125 to send a request for the ARA to the script provider module 135. In some implementations, responsive to determining that the ARA is not present at the end user computing device 125, the low-bandwidth advertisement rendering script can cause the end user computing device 125 to receive the ARA.

In some implementations, responsive to determining that the ARA is present at the end user computing device 125, the low-bandwidth advertisement rendering script can cause the end user computing device 125 determine whether the ARA present at the end user computing device 125 is an up to date version of the ARA. In some implementations, responsive to determining that the ARA present at the end user computing device 125 is not an up to date version of the ARA, the low-bandwidth advertisement rendering script can cause the end user computing device 125 to receive the up to date version of the ARA.

Instead of waiting until the end user computing device 125 has completed buffering the primary video content 210A to receive the ARA, in some implementations, the low-bandwidth advertisement rendering script can cause the end user computing device 125 to determine that a size of the received portion received by the end user computing device 125 is greater than a predetermined threshold. The predetermined threshold can include, for example, a percentage or ratio of the size of the portion of the primary video content 210A received versus the total size of the primary video content 210A, a percentage or ratio of the size of the portion of the primary video content 210A received versus the total size of the primary video content 210A, or specified size of the primary video content 210A (in time or byte size), among others. For example, the low-bandwidth advertisement rendering script can cause the end user computing device 125 to wait until the received portion received by the end user computing device 125 is 75% of the entirety of the primary video content 210A before receiving the ARA. In some implementations, responsive to determining that the size of the receive portion received by the end user computing device 125 is greater than the predetermined threshold, the low-bandwidth advertisement rendering script can cause the end user computing device 125 to receive the ARA. For example, if the current time point 225 is 3 minutes behind the right end of the buffer bar 230 and the predetermined threshold for the size of the received portion is equivalent to 2 minutes and 45 seconds, the low-bandwidth advertisement rendering script can cause the end user computing device 125 to determine that the size of the received portion received by the end user computing device 125 is greater than the predetermined threshold and, responsive to the determination, transmit a request for the ARA to the script provider module 135.

In some implementations, when the end user computing device 125 is receiving the ARA, the low-bandwidth advertisement rendering script can cause the end user computing device 125 to determine that the size of the received portion received by the end user computing device 125 is lower than the predetermined threshold. In some implementations, responsive to determining that the size of the received portion received by the end user computing device is lower than the predetermined threshold while the end user computing device is receiving the ARA, the low-bandwidth advertisement rendering script can cause the end user computing device 125 to stop receiving the ARA. For example, while the end user computing device 125 is receiving the ARA, if the current time point 225 is now 45 seconds behind the right end of the buffer bar and the predetermined threshold for the size of the received portion is equivalent to 2 minutes and 45 seconds, the low-bandwidth advertisement rendering script can cause the end user computing device 125 to send a request to stop receiving the ARA.

Figure 2D:
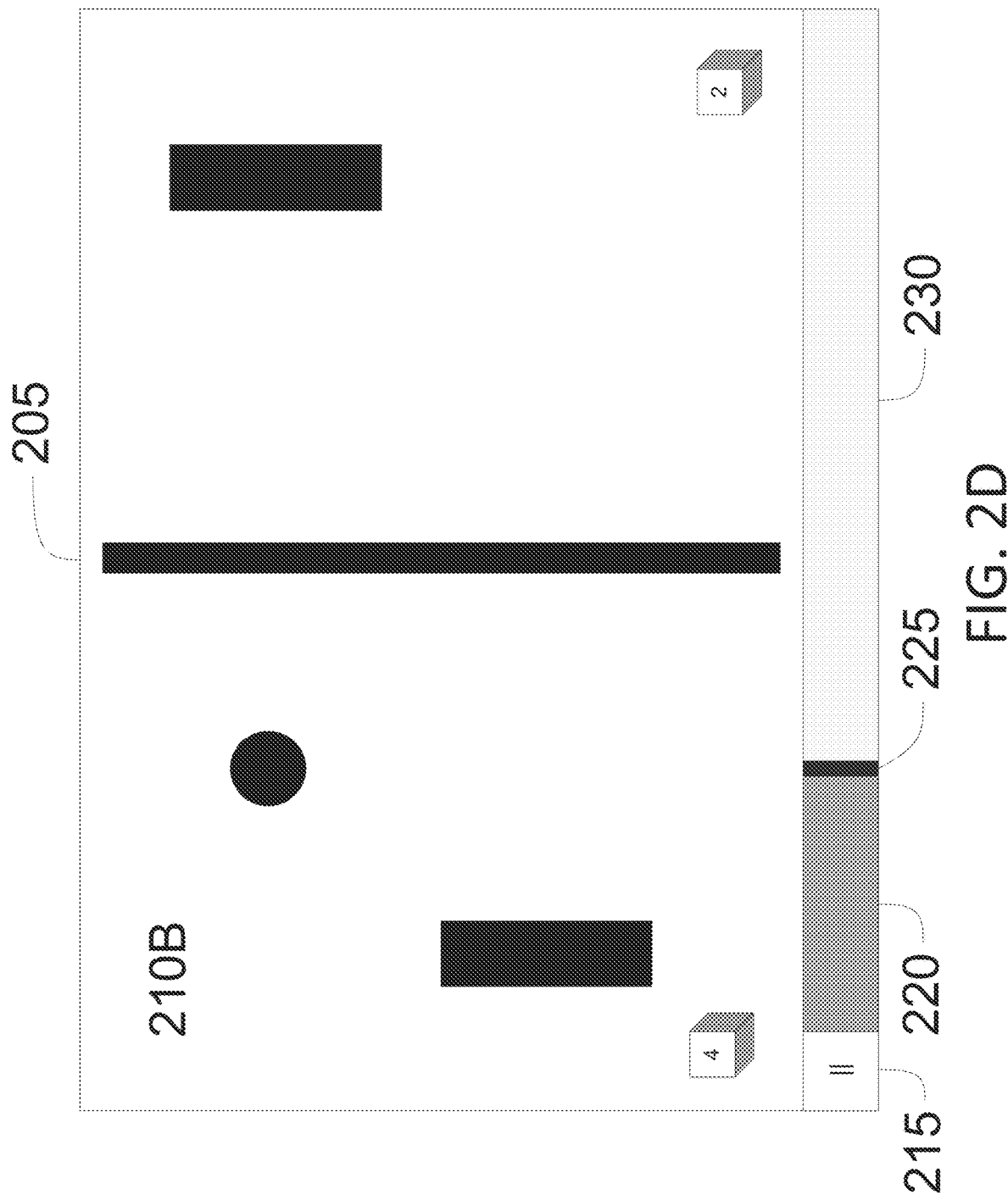
FIG. 2D is a display depicting a video player playing primary video content, according to an illustrative implementation.

FIG. 2D is a display depicting a video player playing primary video content, according to an illustrative implementation. In some implementations, the bandwidth detection module 135 or the data processing system 100 can be configured to receive, from the end user computing device 125, another request for another web page including another primary video content. In some implementations, the bandwidth detection module 135 can be configured to provide, to the end user computing device 125, the other web page including the other primary video content and web page code invoking the low bandwidth advertisement rendering script, responsive to receiving the other request for another web page including another primary video content. The depiction in FIG. 2D shows the other primary video content is 210B. Primary video content 210B depicts a pong match for the purposes of illustration, as primary video content can include any animation, video, or audiovisual content. In further detail, FIG. 2D depicts a video player 205 that may be currently playing the primary video content 210B at the point indicated by the current time point 225 and has completed buffering the entirety of the primary video content 210 as indicated by the lack of an incomplete bar 230 and a full buffer bar 230.

Figure 2E:
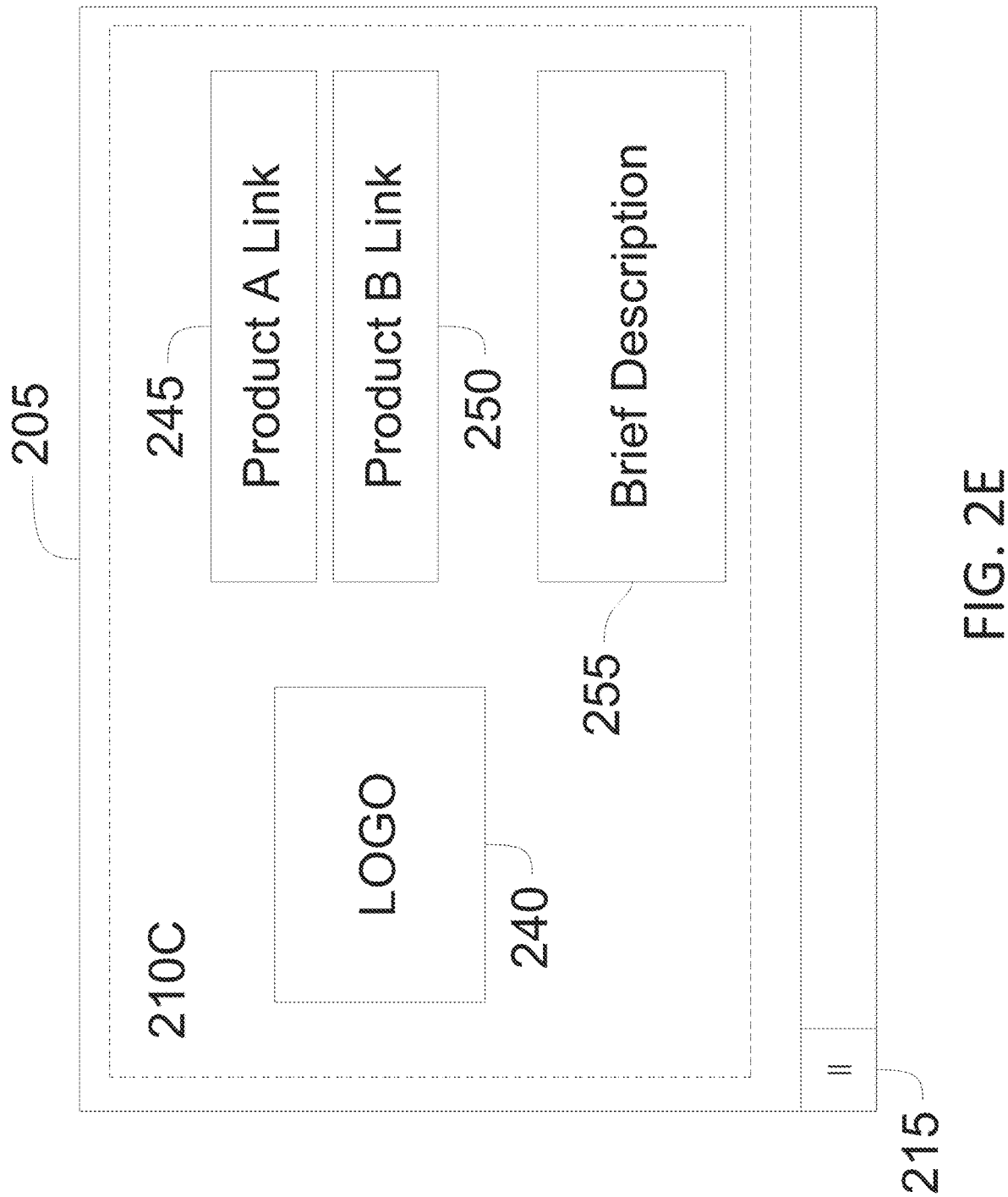
FIG. 2E is a display depicting a video player showing a rendered interactive ad, according to an illustrative implementation.

Similar to FIG. 2C, in FIG. 2D, the end user computing device 125 has completed buffering the primary video content 210B. At this point, in some implementations, responsive to determining that the video player 205 executing on the end user computing device 125 has completed buffering, the low-bandwidth advertisement rendering script can cause the end user computing device 125 to receive the ad content package (ACP). In some implementations, responsive to identifying the triggering event at which to provide content, the low-bandwidth advertisement rendering script can cause the end user computing device 125 to provide for display the interactive advertisement corresponding to the ACP as depicted in FIG. 2E.

In further detail, in some implementations, the low-bandwidth advertisement rendering script can cause the end user computing device 125 to detect or otherwise determine a first time at which the primary video content streamed by a video player 205 executing on the end user computing device 125 has completed buffering. In some implementations, the low-bandwidth advertisement rendering script can cause the end user computing device 125 to determine that a size of the received portion of the primary video content 210B matches a total size of the primary video content 210B to detect a first time at which the primary video content streamed by a video player 205 executing on the end user computing device 125 has completed buffering. In some implementations, the low-bandwidth advertisement rendering script can cause the end user computing device 125 to determine that a size of the buffered portion of the primary video content 210B matches the remaining total portion of the primary video content 210B to detect the first time at which the primary video content 210B streamed by the video player 205 has completed buffering. For example, if the video player 205 started playing the primary video content 210B of 5 minutes in length at 3 minutes, the low-bandwidth advertisement rendering script can cause the end user computing device 125 to determine that the primary video content 210B has completed streaming when the end user computing device 125 has buffered the remaining 2 minutes of the primary video content 210B.

In some implementations, responsive to detecting the first time, the low-bandwidth advertisement rendering script can cause the end user computing device 125 to receive the ad content package (ACP). The ACP can include data to generate an interactive advertisement to be displayed by the video player 205. The ACP can include text, pictures, URL links or URL addresses, or any other data suitable for rendering an interactive ad by the ARA. For example, the ACP can include small size pictures of an advertiser's products, product description text, URL addresses to the advertiser's content, among others. In some implementations, the low-bandwidth advertisement rendering script can cause the end user computing device 125 to send a request for the ACP to the content package provider module 140. In some implementations, responsive to determining that the ACP is not present at the end user computing device 125, the low-bandwidth advertisement rendering script can cause the end user computing device 125 to receive the ACP.

Instead of waiting until the end user computing device 125 has completed buffering the primary video content 210B to receive the ACP, in some implementations, the low-bandwidth advertisement rendering script can cause the end user computing device 125 to determine that a size of the received portion received by the end user computing device 125 is greater than a predetermined threshold. The predetermined threshold can include, for example, a percentage or ratio of the size of the portion of the primary video content 210B received versus the total size of the primary video content 210B, a percentage or ratio of the size of the portion of the primary video content 210B received versus the total size of the primary video content 210B, or specified size of the primary video content 210B (in time or byte size), among others. For example, the low-bandwidth advertisement rendering script can cause the end user computing device 125 to wait until the received portion received by the end user computing device 125 is 40% of the entirety of the primary video content 210B. In some implementations, responsive to determining that the size of the receive portion received by the end user computing device 125 is greater than the predetermined threshold, the low-bandwidth advertisement rendering script can cause the end user computing device 125 to receive the ACP. For example, if the current time point 225 is 3 minutes behind the right end of the buffer bar and the predetermined threshold for the size of the received portion is equivalent to 2 minutes and 45 seconds, the low-bandwidth advertisement rendering script can cause the end user computing device 125 to determine that the size of the received portion received by the end user computing device 125 is greater than the predetermined threshold and, responsive to the determination, send a request for the ACP to the script provider module 135.

In some implementations, when the end user computing device 125 is receiving the ACP, the low-bandwidth advertisement rendering script can cause the end user computing device 125 to determine that the size of the received portion received by the end user computing device 125 is lower than the predetermined threshold. In some implementations, responsive to determining that the size of the received portion received by the end user computing device is lower than the predetermined threshold while the end user computing device is receiving the ACP, the low-bandwidth advertisement rendering script can cause the end user computing device 125 to send a request to stop receiving the ACP. For example, while the end user computing device 125 is receiving the ACP, if the current time point 225 is now 45 seconds behind the right end of the buffer bar 230 and the predetermined threshold for the size of the received portion is equivalent to 2 minutes and 45 seconds, the low-bandwidth advertisement rendering script can cause the end user computing device 125 to send a request to stop receiving the ACP.

In some implementations, responsive to receiving the ACP packet, the low-bandwidth advertisement rendering script can cause the end user computing device 125 to identify a triggering event. In some implementations, identifying the triggering event can include determining that the primary video content 210B has completed streaming. For example, when the video player 205 has completed playing the primary video content 210B, the low-bandwidth advertisement rendering script can cause the end user computing device 125 to identify the completion of streaming of the primary video content 210B as the triggering event. In some implementations, identifying the triggering event can include receiving from the end user computing device 125 a request to view another primary video content. For example, even while the video player 205 is playing the primary video content 210B, the end user computing device 125 can send a request to view another primary video content from links 206A-206B on the same web page 200. In this example, once the end user computing device 125 sends the request to view the other primary video content, the low-bandwidth advertisement rendering script can cause the end user computing device 125 can be configured to identify the request to view the other primary video content as a triggering event. In some implementations, identifying the triggering event can include determining that a size of the portion of the primary video content 210B received by the end user computing device 125 is greater than a predetermined threshold. For example, if the current time point 225 is at 3 minutes 20 seconds behind the right end of the buffer bar and the predetermined threshold for the size of the received portion is equivalent to 2 minutes, the low-bandwidth advertisement rendering script can cause the end user computing device 125 to determine the received portion of the primary video content 210B being greater than the predetermined threshold as a triggering event.

In some implementations, responsive to identifying the triggering event at which to provide content, the low-bandwidth advertisement rendering script can cause the end user computing device 125 to provide, for display, the interactive advertisement corresponding to the ACP. In some implementations, the low-bandwidth advertisement rendering script can cause the end user computing device 125 to parse, via the ARA, the ACP to generate the interactive ad. In some implementations, the low-bandwidth advertisement rendering script can cause the end user computing device 125 to select an interactive ad template based on the ACP or template selection parameters. One or more interactive ads template can be included in the ARA, when received by the end user computing device 125. The interactive ad template can specify the type of content, such as textboxes, hyperlinks, and pictures, and placement of the content. The interactive ad template can also include different extensions, such as click-to-call, click-for-directions, and click for more information, among others. In some implementations, the ARA can cause the end user computing device 125 to select the interactive ad template based on the template selection parameters. Template selection parameters can include, for example, the type of industry of the advertiser, type of primary video content 210B, type of end user computing device 125, and screen size of the display at the end user computing device 125, among others. The ACP can include an indication of which interactive ad template to be selected by the ARA.

Based on the interactive ad template and the ACP, the low-bandwidth rendering script can cause the end user computing device 125 to parse the ACP to generate an interactive ad. For example, suppose the received ACP includes an advertiser's logo, two hyperlinks to two of the advertiser's products, and a brief textual description of the advertiser, the industry of the advertiser is fashion, and the end user computing device 125 is a tablet. In this example, the low-bandwidth advertisement rendering script can cause the end user computing device 125 to select an interactive ad template that indicates that the interactive ad template is for a tablet and for a fashion industry advertiser and also has space for a logo, two links, and a small text box and generate the interactive ad. Based on the selection, the low-bandwidth advertisement rendering script can cause the end user computing device 125 to insert the advertiser's logo, two hyperlinks to two of the advertiser's products, and a brief textual description of the advertiser into the space for the logo, two links, and small text boxes in the interactive ad template. The low-bandwidth advertisement rendering script can cause the end user computing device 125 to display the interactive advertisement. The interactive ad template and the data included in the ACP described are for illustrative purposes, as there may be any variation of templates with the ARA and any number of data included in the ACP.

FIG. 2E is a display depicting a video player playing a rendered interactive ad, according to an illustrative implementation. In further detail, the interactive ad 210C of FIG. 2E includes a logo 240, link to product A 245, link to product B 250, and a brief description 255. The interactive ad 210C can be displayed in the video player 205 over a portion of the primary video content (as indicated by the dotted line), responsive to the end user computing device 125 identifying a triggering event. In this example, video player 205 lacks the progress indicators (played bar 220, current point 225, buffered bar 230, and incomplete bar 235 of FIG. 2B) video seek bar generally along the bottom. The logo 240 can include a picture (e.g., GIF or JPEG) of the logo of the advertiser or one of the advertiser's products. Link to product A 245 and link to product B 250 can include hyperlinks to the products or services advertised by the advertiser. The links 245 and 250 can also include overlay pictures depicting the products or services advertised. The brief description 225 can include textual description of the products or services advertised or the advertiser itself. FIG. 2E is an illustrative depiction of an interactive ad, as the interactive ad can include any number or variation of placement of the data included with the ACP.

While the interactive ad 210C is rendered on the video player 205, in some implementations, the end user computing device 125 can receive a second primary video content and, responsive to determining that the entire second primary video content is received, the low-bandwidth advertisement rendering script can cause the end user computing device 125 to stop rendering the interactive ad 210C and provide for display the second primary video content. For example, the end user computing device 125 can send a request for a web page 200 with another primary video content 210 or a request to view another primary video content from links 206A-206B on the same web page 200, and receive the other primary video content from the data processing system 110. In this example, responsive to determining that the end user computing device 125 has received the entirety of the other primary video content, the low-bandwidth advertisement rendering script can cause the end user computing device 125 to stop displaying the interactive ad 210C and play the other primary video content. In some implementations, the end user computing device 125 can receive a second primary video content and, responsive to determining that at least a predetermined portion of the second primary video content is received at the end user computing device 125, the low-bandwidth advertisement rendering script can cause the end user computing device 125 to stop rendering the interactive ad 210C and provide for display the second primary video content.

Figure 3:
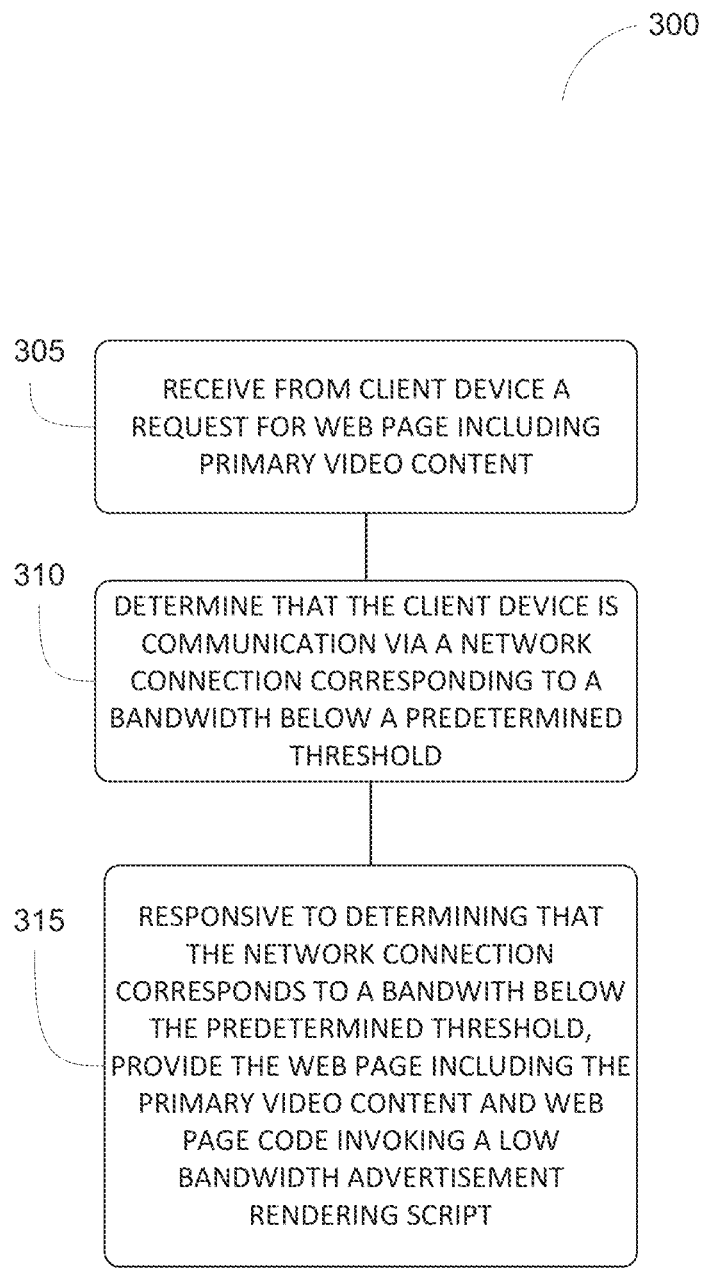
FIG. 3 is a flow diagram depicting a method of providing interactive content for display, according to an illustrative implementation.

FIG. 3 is a flow diagram depicting a method 300 for providing interactive content for display. The functionality described herein described in the method 300 can be performed by the data processing system 110 or the various modules of the data processing system 110 shown in FIG. 1. In brief overview, the data processing system can receive, from an end user computing device, a request for a web page including primary video content (BLOCK 305). The data processing system can determine that the end user computing device is communicating with the data processing system via a network connection corresponding to a bandwidth below a predetermined threshold (BLOCK 310). Responsive to determining that the network connection corresponds to a bandwidth below the predetermined threshold, the data processing system can provide, to the end user computing device, the web page including the primary video content and web page code invoking a low bandwidth advertisement rendering script responsive to the request for the web page (BLOCK 315).

In further detail, the data processing system can receive, from an end user computing device, a request for a web page including primary video content (BLOCK 305). In some implementations, the data processing system can determine that the request for the web page is specifically a request for a web page that includes primary video content. In some implementations, the data processing system can determine that the URL address is of a webpage that includes primary video content. For example, the data processing system can determine that the request for the web page with the URL address of "www.example.com/video345.html" is a request for a web page including primary video content by accessing a database of known web pages that include primary video content from the database. The data processing system can also parse the code of the web page to determine whether the web page includes primary video content. In some implementations, the data processing system can also identify one or more predetermined words or set of characters, for instance, "video" or "vdo," in the URL to determine whether the web page includes primary video content.

The data processing system can determine that the end user computing device is communicating with the data processing system via a network connection corresponding to a bandwidth below a predetermined threshold (BLOCK 310). The predetermined threshold can include various measures, for example, a maximum data throughput, maximum application level goodput, an average bit rate, or latency, among others. In some implementations, the data processing system can determine that the request for the web page including the primary video content includes a location identifier associated with a geographical location where the network connection may correspond to a bandwidth below a predetermined threshold. For example, the data processing system can determine the geographical location based on the IP address received with the request for the web page including the primary content. In this example, based on the determined geographical location, the data processing system can determine that the end user computing device is communicating via a network connection corresponding to a bandwidth below a predetermined threshold. In some implementations, the database can maintain a listing of geographical locations with network connections corresponding to a bandwidth below the predetermined threshold. In some implementations, when the data processing system determines that an end user computing device from one geographical location is communicating with the data processing system via a network connection corresponding to a bandwidth below a predetermined threshold, the data processing system can determine that another end user computing device from the same geographical location is communicating with the data processing system via a network connection corresponding to a bandwidth below the predetermined threshold based on the same geographical location. For example, if the database already includes a rural part of a states a geographical location with a network connection corresponding to a bandwidth below the predetermined threshold and the bandwidth module receives a request for a web page including primary video content from the end user computing device that includes a location identifier associated with the rural part of a state, the data processing system can determine that the end user computing device is communicating with the data processing system via a network connection corresponding to a bandwidth below the predetermined threshold.

In some implementations, the data processing system can identify a device type of the end user computing device associated with the request for the web page including the primary video content to determine that the end user computing device is communicating with the data processing system via a network connection corresponding to a bandwidth below a predetermined threshold based on a device type of the end user computing device. For example, if the device type included with the request for the web page including the primary video content indicates that the request for the web page including the primary video content is from a mobile smartphone, the data processing system can determine that the end user computing device is communicating via a network connection corresponding to a bandwidth below a predetermined threshold.

In some implementations, the data processing system can measure the bandwidth of the network connections between the end user computing device and the data processing system to determine whether the end user computing device is communicating with the data processing system via a network connection corresponding to a bandwidth below a predetermined threshold. For example, the data processing system can measure, detect or otherwise determine the maximum data throughput of the network connections between the end user computing device and the data processing system. In this example, if the measured maximum data throughput is below a threshold throughput, the data processing system can determine that the end user computing device is communicating with the data processing system via a network connection corresponding to bandwidth below a predetermined threshold. In some implementations, the data processing system can determine the type of network connection to determine that the end user computing device is communicating with the data processing system via a network connection corresponding to a bandwidth below a predetermined threshold. For example, if the type of network connection between the end user computing device and the data processing system is 2G, the data processing system can identify the network connection as 2G and based on the identification. In this example, the data processing system can determine that the network connection corresponds to a bandwidth below a predetermined threshold based on identifying the network connection as 2G.

Responsive to determining that the network connection corresponds to a bandwidth below the predetermined threshold, the data processing system can provide, to the end user computing device, the web page including the primary video content and web page code invoking a low bandwidth advertisement rendering script responsive to the request for the web page (BLOCK 315). The data processing system can provide the webpage in response to the data processing system determining that the bandwidth of the network connection between the end user computing device is below a predetermined threshold. In some implementations, the data processing system can invoke the data processing system to provide, to the end user computing device, the web page including the primary video content and web page code invoking the low bandwidth advertisement rendering script.

The low bandwidth advertisement rendering script can cause the end user computing device to: (i) determine, on loading the web page at the end user computing device, that an ad rendering application (ARA) that can render interactive ads based on content retrieved form advertisement content packages provided by the data processing system is present; (ii) responsive to determining that the ARA is present, detect a first time at which the primary video content is streamed by a video player executing on the end user computing device has completed buffering; (iii) responsive to detecting the first time, receive the ad content package (ACP) that includes data to generate an interactive advertisement to be displayed by the video player from the data processing system; (iv) responsive to receiving the ACP packet, identify a triggering event; and (v) responsive to identifying the triggering event at which to provide, for display, the interactive advertisement corresponding to the ACP.

Figure 4:
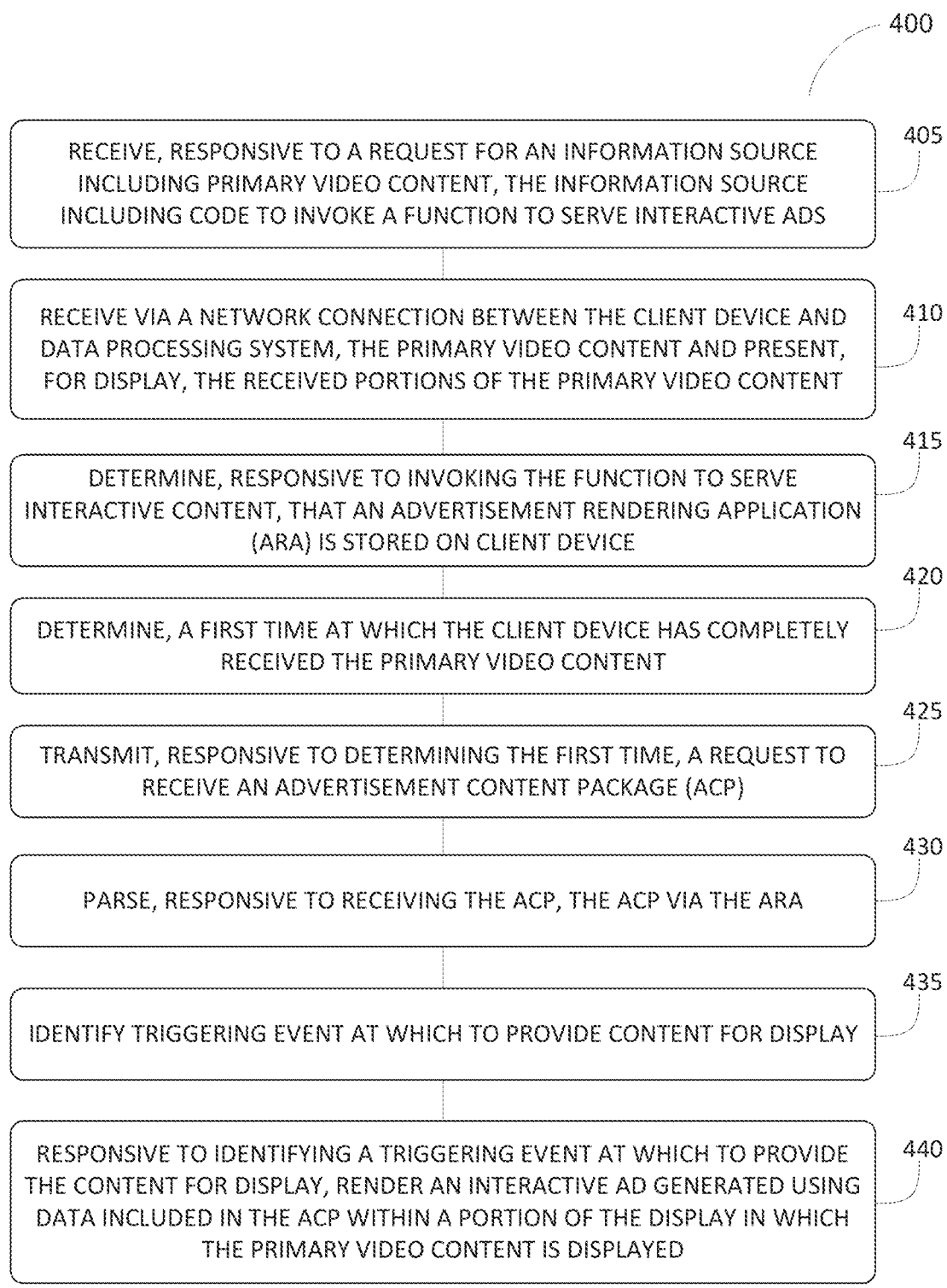
FIG. 4 is a flow diagram depicting a method of providing interactive content for display, according to an illustrative implementation.

FIG. 4 is a flow diagram depicting a method 400 for providing interactive content for display. The functionality described herein described in the method 400 can be performed by the end user computing device 125, browser, low-bandwidth advertisement rendering script, or any other script on the end user computing device 125 shown in FIG.

1. In brief overview, the end user computing device can receive, responsive to a request for an information resource including primary video content, the information resource including code to invoke a function to serve interactive ads (BLOCK 405). The end user computing device can receive, via a network connection between the end user computing device and a data processing system, the primary video content and presenting, for display, the received portions of the primary video content (BLOCK 410). The end user computing device can determine, responsive to invoking the function to serve interactive content, that an advertisement rendering application (ARA) is stored on the end user computing device (BLOCK 415). The end user computing device can determine a first time at which the client device has completely received the primary video content (BLOCK 420). The end user computing device can responsive to determining the first time, a request to receive an advertisement content package (ACP) (BLOCK 425). The end user computing device can parse, responsive to receiving the ACP, the ACP via the ARA (BLOCK 430). The end user computing device can identify a triggering event at which to provide the interactive ad for display (BLOCK 435). The end user computing device can, responsive to identifying a triggering event at which to provide content for display, render an interactive ad generated using data including in the ACP within a portion of the display in which the primary video content is displayed (BLOCK 440).

In further detail, the end user computing device can receive, responsive to a request for an information resource including primary video content, the information resource including code to invoke a function to serve interactive ads (BLOCK 405). In some implementations, the end user computing device can receive the information resource, responsive to a data processing system determining that the end user computing device corresponds to a bandwidth connection below a predetermined threshold.

The end user computing device can receive, via a network connection between the end user computing device and a data processing system, the primary video content and present, for display, the received portions of the primary video content (BLOCK 410). In some implementations, the end user computing device can transmit a request to retrieve the primary content upon loading the information resource.

The end user computing device can determine, responsive to invoking the function to serve interactive content, that an advertisement rendering application (ARA) is stored on the end user computing device (BLOCK 415). In some implementations, the end user computing device can determine, on loading the web page that an ad rendering application is present (ARA). In some implementations, responsive to determining that the ARA is not present at the end user computing device, the end user computing device can send a request for the ARA to the data processing system. In some implementations, responsive to determining that the ARA is not present at the end user computing device, the end user computing device can receive the ARA from data processing system.

In some implementations, responsive to determining that the ARA is present at the end user computing device, the end user computing device can determine whether the ARA present at the end user computing device is an up to date version of the ARA. In some implementations, responsive to determining that the ARA present at the end user computing device is not an up to date version of the ARA, the end user computing device can receive the up to date version of the ARA.

Instead of waiting until the end user computing device has completed buffering the primary video content to receive the ARA, in some implementations, the end user computing device can determine that a size of the received portion received by the end user computing device is greater than a predetermined threshold. The predetermined threshold can include or be based on, for example, a percentage or ratio of the size of the portion of the primary video content received versus the total size of the primary video content, a percentage or ratio of the size of the portion of the primary video content received versus the total size of the primary video content, or specified size of the primary video content, among others. For example, the end user computing device can wait until the received portion received by the end user computing device 125 is 75% of the entirety of the primary video content before receiving the ARA. In some implementations, responsive to determining that the size of the receive portion received by the end user computing device is greater than the predetermined threshold, the end user computing device can receive the ARA. For example, if the current time point is 3 minutes behind the right end of the buffer bar and the predetermined threshold for the size of the received portion is equivalent to 2 minutes and 45 seconds, the end user computing device can determine that the size of the received portion received by the end user computing device is greater than the predetermined threshold and, responsive to the determination, send a request for the ARA to the data processing system.

In some implementations, when the end user computing device is receiving the ARA, the end user computing device can determine that the size of the received portion received by the end user computing device is lower than the predetermined threshold. In some implementations, responsive to determining that the size of the received portion received by the end user computing device is lower than the predetermined threshold while the end user computing device is receiving the ARA, the end user computing device can stop receiving the ARA. For example, while the end user computing device is receiving the ARA, if the current time point is now 45 seconds behind the right end of the buffer bar and the predetermined threshold for the size of the received portion is equivalent to 2 minutes and 45 seconds, the end user computing device can send a request to stop receiving the ARA.

The end user computing device can determine a first time at which the client device has completely received the primary video content (BLOCK 420). In some implementations, the end user computing device can determine that a size of the received portion of the primary video content matches a total size of the primary video content to determine a first time at which the primary video content streamed by a video player executing on the end user computing device has completed buffering. In some implementations, end user computing device can determine that a size of the buffered portion of the primary video content matches the remaining total portion of the primary video content to determine the first time at which the primary video content streamed by the video player has completed buffering. For example, if the video player started playing the primary video content of 5 minutes in length at 3 minutes, end user computing device can determine that the primary video content has completed streaming when the end user computing device has buffered the remaining 2 minutes of the primary video content.

The end user computing device can responsive to determining the first time, a request to receive an advertisement content package (ACP) (BLOCK 425). The ACP can include data to generate an interactive advertisement to be displayed by the video player. The ACP can include text, pictures, URL addresses, or any other data suitable for rendering an interactive ad by the ARA. For example, the ACP can include small size pictures of an advertiser's products, product description text, URL addresses as links to the advertiser's content, among others. In some implementations, the end user computing device can send a request for the ACP to the data processing system. In some implementations, responsive to determining that the ACP is not present at the end user computing device, the end user computing device can receive the ACP. In some implementations, the end user computing device can receive the advertiser's content as indicated in the URL addresses locally on the end user computing device. For example, if the URL address is to a JPEG file of the advertiser's logo, the end user computing device can download the JPEG file at the URL address and store the JPEG file locally on the hard drive of the end user computing device.

Instead of waiting until the end user computing device has completed buffering the primary video content to receive the ACP, in some implementations, the end user computing device can determine that a size of the received portion received by the end user computing device is greater than a predetermined threshold. The predetermined threshold can include, for example, a percentage or ratio of the size of the portion of the primary video content received versus the total size of the primary video content, a percentage or ratio of the size of the portion of the primary video content received versus the total size of the primary video content, or specified size of the primary video content (in time or byte size), among others. For example, the end user computing device can wait until the received portion received by the end user computing device is 40% of the entirety of the primary video content. In some implementations, responsive to determining that the size of the receive portion received by the end user computing device 125 is greater than the predetermined threshold, the end user computing device can receive the ACP.

In some implementations, when the end user computing device is receiving the ACP, the end user computing device can determine that the size of the received portion received by the end user computing device is lower than the predetermined threshold. In some implementations, responsive to determining that the size of the received portion received by the end user computing device is lower than the predetermined threshold while the end user computing device is receiving the ACP, the end user computing device can send a request to stop receiving the ACP. For example, while the end user computing device is receiving the ACP, if the current time point is now 45 seconds behind the right end of the buffer bar and the predetermined threshold for the size of the received portion is equivalent to 2 minutes and 45 seconds, the end user computing device can send a request to stop receiving the ACP.

The end user computing device can parse, responsive to receiving the ACP, the ACP via the ARA (BLOCK 430). In some implementations, the low-bandwidth advertisement rendering script can cause the end user computing device 125 to select an interactive ad template based on the ACP or template selection parameters. One or more interactive ads template can be included in the ARA, when received by the end user computing device 125. The interactive ad template can specify the type of content, such as textboxes, hyperlinks, and pictures, and placement of the content. The interactive ad template can also include different extensions, such as click-to-call, click-for-directions, and click for more information, among others. In some implementations, the ARA can cause the end user computing device 125 to select the interactive ad template based on the template selection parameters. Template selection parameters can include, for example, the type of industry of the advertiser, type of primary video content 210B, type of end user computing device 125, and screen size of the display at the end user computing device 125, among others. The ACP can include an indication of which interactive ad template to be selected by the ARA.

Based on the interactive ad template and the ACP, the end user computing device can parse the ACP to generate an interactive ad. For example, suppose the received ACP includes an advertiser's logo, two hyperlinks to two of the advertiser's products, and a brief textual description of the advertiser, the industry of the advertiser is fashion, and the end user computing device is a tablet. In this example, the end user computing device can select an interactive ad template that indicates that the interactive ad template is for a tablet and for a fashion industry advertiser and also has space for a logo, two links, and a small text box and generate the interactive ad. Based on the selection, the end user computing device can insert the advertiser's logo, two hyperlinks to two of the advertiser's products, and a brief textual description of the advertiser into the space for the logo, two links, and small text boxes in the interactive ad template. The end user computing device can display the interactive advertisement. The interactive ad template and the data included in the ACP described are for illustrative purposes, as there may be any variation of templates with the ARA and any number of data included in the ACP.

The end user computing device can identify a triggering event at which to provide content for display (BLOCK 435). In some implementations, identifying the triggering event can include determining that the primary video content has completed streaming. For example, when the video player has completed playing the primary video content, the end user computing device can identify the completion of streaming of the primary video content as the triggering event. In some implementations, identifying the triggering event can include receiving from the end user computing device a request to view another primary video content. For example, even while the video player is playing the primary video content, the end user computing device 125 can send a request to view another primary video content. In this example, once the end user computing device sends the request to view the other primary video content, the end user computing device can identify the request to view the other primary video content as a triggering event. In some implementations, identifying the triggering event can include determining that a size of the portion of the primary video content received by the end user computing device is greater than a predetermined threshold. For example, if the current time point is at 3 minutes 20 seconds behind the right end of the buffer bar and the predetermined threshold for the size of the received portion is equivalent to 2 minutes, the end user computing device can determine the received portion of the primary video content being greater than the predetermined threshold as a triggering event.

The end user computing device can, responsive to identifying a triggering event at which to provide content for display, render an interactive ad generated using data including in the ACP within a portion of the display in which the primary video content is displayed (BLOCK 440). In some implementations, the end user computing device can provide, for display, the generated interactive ad within the portion of display in which the primary video content is displayed. responsive to identifying the triggering event at which to provide content In some implementations, the end user computing device can receive an action to request a second video content, present the interactive ad for display in a portion of the display, and, responsive to determining that a size of the portion of the second video content is greater than a predetermined threshold, present, for display, the second video content in the portion of the display in which the interactive ad was presented. For example, if the end user computing device sent a request for a second video content and has received 50 Mb of the second video content above the predetermined threshold of 35 Mb, the end user computing device can stop display the rendered interactive ad and start streaming for display the second video content. In some implementations, the end user computing device can receive an action to request a second video content, present the interactive ad for display, and, responsive to determining that the entire second video content is received, present, for display, the second video content instead of the interactive ad. The action to request a second video content can include, for example, a request for another primary video content linked to the same webpage as the current primary video content or a request for another web page with another primary video content, among others. For example, when the end user computing device has sent a request for a second video content and has received the entire of the second video content, the end user computing device can stop rendering the interactive ad and start playing the second video content.

Figure 5:
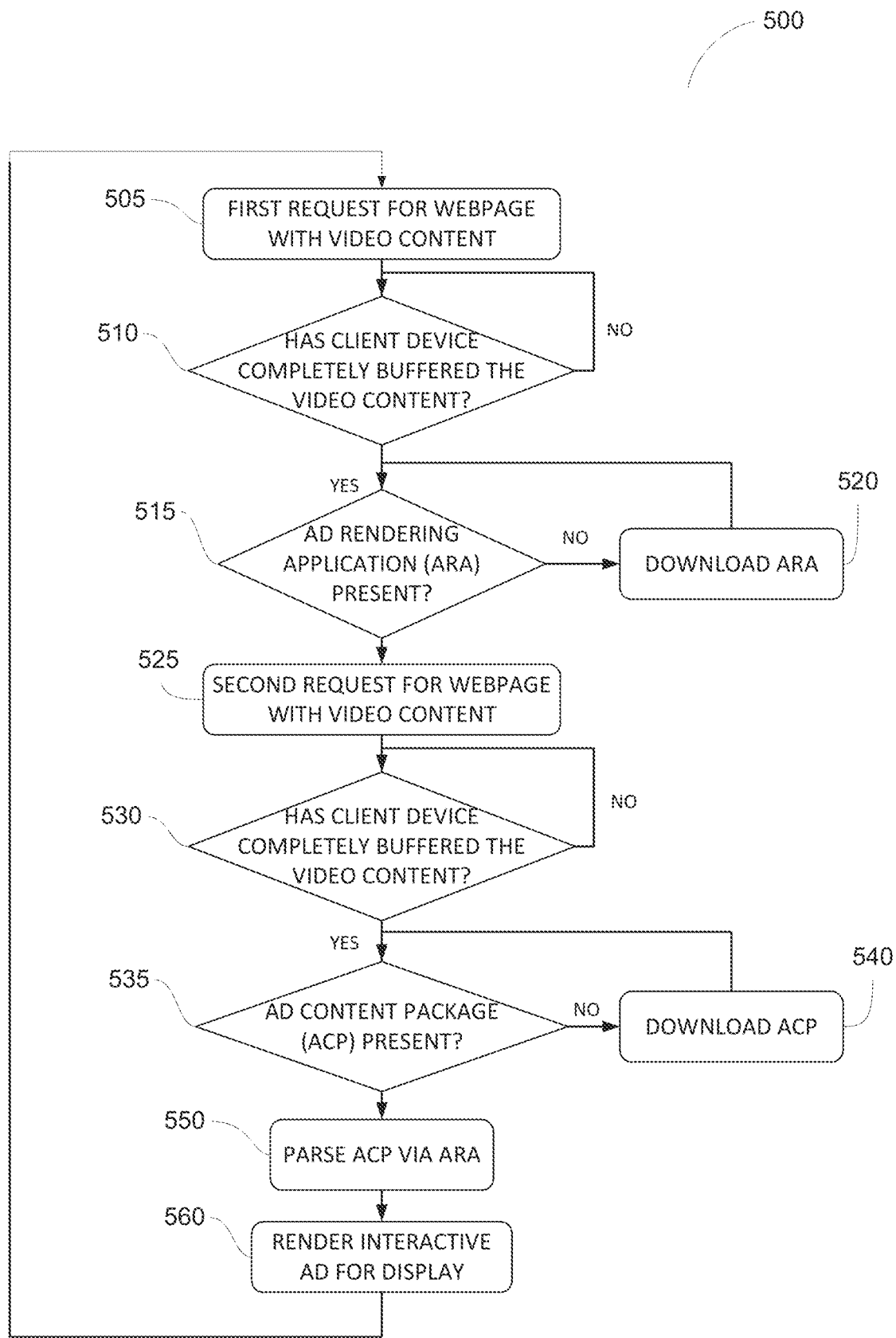
FIG. 5 is a flow diagram depicting a method of providing interactive content for display, according to an illustrative implementation.

FIG. 5 is a flow diagram depicting a method 500 for providing interactive content for display. The functionality described herein described in the method 500 can be performed by the end user computing device 125, browser, low-bandwidth advertisement rendering script, or any other script on the end user computing device 125 shown in FIG. 1. In overview, the end user computing device can send a first request for web page with video content (BLOCK 505). The end user computing device can then determine whether the end user computing device has completely buffered the video content (BLOCK 510). If the end user computing device has determined that the end user computing device has not yet completely buffered the video content, the end user computing device repeats the determination. If the end user computing device has determined that the end user computing device has completed buffering the video content, the end user computing device can determine whether an ad rendering application (ARA) is present on the end user computing device (BLOCK 515). If the end user computing device does not have the ARA, the end user computing device can download the ARA (BLOCK 520) and return to determination. If the end user computing device has the ARA, the end user computing device can continue. The end user computing device can then send a second request for web page with video content (BLOCK 525). The end user computing device can then determine whether the end user computing device has completely buffered the video content (BLOCK 530). If the end user computing device has not yet completely buffered the video content, the end user computing device repeats the determination. If the end user computing device has completed buffering the video content, the end user computing device can determine whether an ad content package (ACP) is present on the end user computing device (BLOCK 535). If the ACP is not present on the end user computing device, the end user computing device can download the ACP (BLOCK 540) and return to the determination. Once the ACP is determined to be present on the end user computing device, the end user computing device can parse the ACP via the ARA (BLOCK 550). The end user computing device can then render the interactive ad generated from the parsing of the ACP for display on the end user computing device.

Figure 6:
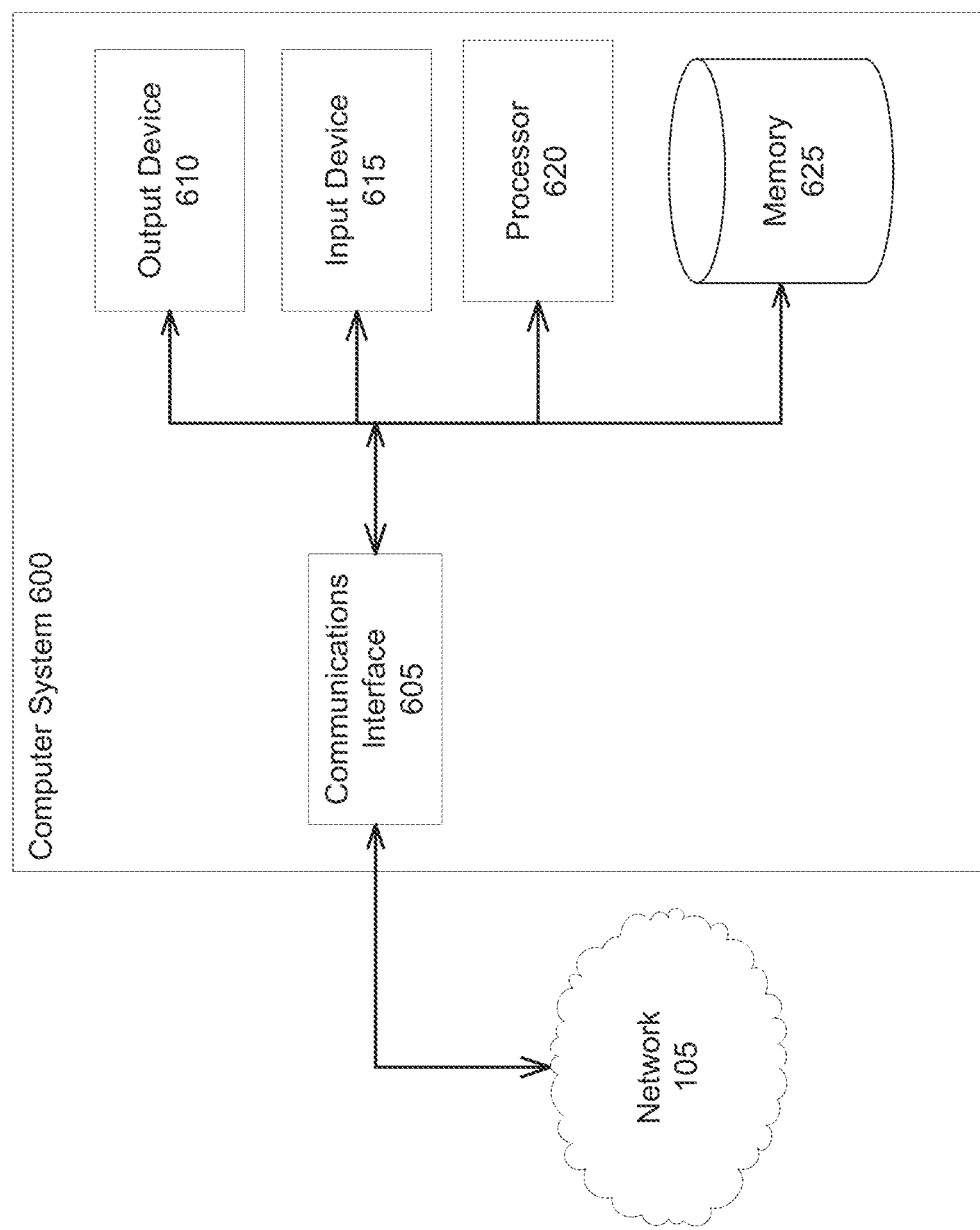
FIG. 6 is a block diagram illustrating a general architecture for a computer system that may be employed to implement elements of the systems and methods described and illustrated herein, according to an illustrative implementation.

FIG. 6 shows the general architecture of an illustrative computer system 600 that may be employed to implement any of the computer systems discussed herein (including the system 110 and its components such as the bandwidth detection module 130, the script provider module 135 and the content package provider module 140) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the bandwidth detection module 130, the script provider module 135 and the content package provider module 140.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 145. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 60. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 60.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The bandwidth detection module 130, the script provider module 135 and the content package provider module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the bandwidth detection module 130, the script provider module 135 and the content package provider module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and responsive to determining a change in the data, identifying one or more content items to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system of providing interactive content for display, comprising a client device having one or more processors to:
   receive, by the client device, at least a portion of a first video content item;
   transmit, by a content rendering application executed by the client device, a first request for content responsive to receiving an amount of the first video content greater than a first predetermined threshold, the first predetermined threshold corresponding to a value based on at least one of a total length of time of the first video content item or a file size of the first video content item;
   receive a content package configured to be processed by the content rendering application responsive to the first request, the content package including elements used by the content rendering application to render interactive content;
   identify a triggering event to display content of the content package; and
   display, by the content rendering application, the interactive content of the content package responsive to identifying the triggering event.

2. The system of claim 1, wherein the one or more processors are configured to:
   receive at least a portion of a second video content item;
   determine that the client device has received an amount of the second video content item greater than a second predetermined threshold;
   transmit, to a data processing system, a second request for content responsive to receiving an amount of the second video content item greater than the second predetermined threshold; and
   receive, responsive to the second request for content, the content rendering application configured to render interactive content based on content retrieved from content packages provided by the data processing system.

3. The system of claim 1, wherein the triggering event comprises a display of the first video content item.

4. The system of claim 1, wherein the triggering event comprises a request for a second video content item.

5. The system of claim 1, further comprising the client device to determine that the client device is communicating with a data processing system over a network connection having a bandwidth below a bandwidth threshold.

6. The system of claim 5, wherein the bandwidth threshold comprises at least one of a maximum data throughput, a maximum application level goodput, an average bit rate, a latency, a bit error rate, or a round-trip delay time.

7. The system of claim 1, further comprising the client device to receive code comprising an instruction to display the interactive content of the content package.

8. The system of claim 1, further comprising the client device to:
   parse code of a web page to identify the second video content item; and
   transmit the first request responsive to identifying the second video content item.

9. The system of claim 1, further comprising the client device to:
   determine that the first video content item has buffered a predetermined amount; and
   transmit the first request based on the first video content item buffering the predetermined amount.

10. A method of providing interactive content for display, comprising:
    receiving, by a client device, at least a portion of a first video content item;
    transmitting, by a content rendering application executing on the client device and responsive to receiving an amount of the first video content greater than a first predetermined threshold, a first request for content, the first predetermined threshold corresponding to a value based on at least one of a total length of time of the first video content item or a file size of the first video content item;
    receiving, by the content rendering application executing on the client device, a content package configured to be processed by the content rendering application responsive to the first request, the content package including elements used by the content rendering application to render interactive content;
    identifying, by the content rendering application executing on the client device, a triggering event to display content of the content package; and
    displaying, by content rendering application executed by the client device, the interactive content of the content package responsive to identifying the triggering event.

11. The method of claim 10, further comprising:
    receiving, by the client device, at least a portion of a second video content item;

determining, by the client device, that the client device has received an amount of the second video content item greater than a second predetermined threshold;

transmitting, by the client device to a data processing system, a second request for content responsive to receiving an amount of the second video content item greater than the second predetermined threshold; and receiving, by the client device, responsive to the second request for content, the content rendering application configured to render interactive content based on content retrieved from content packages provided by the data processing system.

12. The method of claim 10, wherein the triggering event comprises a display of the first video content item.

13. The method of claim 10, wherein the triggering event comprises a request for a second video content item.

14. The method of claim 10, further comprising:
determining, by the client device, that the client device is communicating with a data processing system over a network connection having a bandwidth below a bandwidth threshold.

15. The method of claim 14, wherein the bandwidth threshold comprises at least one of a maximum data throughput, a maximum application level goodput, an average bit rate, a latency, a bit error rate, or a round-trip delay time.

16. The method of claim 10, further comprising:
receiving, by the client device from a data processing system, code comprising an instruction to display the interactive content of the content rendering package.

17. The method of claim 10, further comprising:
parsing, by the content rendering application executing on the client device, code of a web page to identify the first video content item; and transmitting, by the client device, the first request responsive to identifying the first video content item.

18. The method of claim 10, further comprising:
determining, by the client computing device, that the first video content item has buffered a predetermined amount; and transmitting, by the client computing device, the first request based on the first video content item buffering the predetermined amount.

* * * * *